(12) United States Patent
Urfig (10) Patent No.: US 7,363,774 B2
(45) Date of Patent: Apr. 29, 2008

(54) AIR COOLING DEVICE

(75) Inventor: Bernard Elan Urfig, North Vancouver (CA)

(73) Assignee: Misterchill, LLC, Los Angeles, CA (US)

( * ) Notice: Subject to any disclaimer, the term of this patent is extended or adjusted under 35 U.S.C. 154(b) by 0 days.

(21) Appl. No.: 11/489,662

(22) Filed: Jul. 17, 2006

(65) Prior Publication Data

US 2006/0254306 A1 Nov. 16, 2006

Related U.S. Application Data

(63) Continuation of application No. 11/009,922, filed on Dec. 10, 2004, now Pat. No. 7,127,910.

(51) Int. Cl.
*F25D 3/02* (2006.01)

(52) U.S. Cl. .............................. 62/420; 62/425; 62/529

(58) Field of Classification Search .......... 62/420–425, 62/529–530; 165/10; 126/400
See application file for complete search history.

(56) References Cited

U.S. PATENT DOCUMENTS

| 1,922,790 | A | 8/1933 | Alger |
| D93,401 | S | 9/1934 | Jepertinger |
| D157,840 | S | 3/1950 | Carraway |
| 2,802,347 | A | 8/1957 | Marcus |
| 3,774,410 | A | 11/1973 | Hans |
| 4,879,880 | A | 11/1989 | Harrison |
| 5,046,329 | A | 9/1991 | Travis, III |
| 5,159,819 | A | 11/1992 | Wong |
| 5,212,963 | A * | 5/1993 | McGinnis ................. 62/457.4 |
| 5,314,005 | A | 5/1994 | Dobry |
| 5,359,864 | A | 11/1994 | Yamada |
| 5,860,293 | A | 1/1999 | Piro |
| 5,953,933 | A | 9/1999 | Cheng |
| 6,192,702 | B1 | 2/2001 | Shimogori |
| 6,227,004 | B1 * | 5/2001 | Gerstein ..................... 62/421 |
| 6,269,651 | B1 | 8/2001 | Price |
| 6,357,251 | B1 | 3/2002 | Marks |
| 6,497,116 | B2 * | 12/2002 | Noel ........................... 62/530 |
| 2004/0011073 | A1 | 1/2004 | Blackstone |

* cited by examiner

*Primary Examiner*—William E. Tapolcai
(74) *Attorney, Agent, or Firm*—Cislo & Thomas, LLP (57) ABSTRACT

An air cooling device includes a thermally insulated container packed with encapsulated refrigerant and configured to pass incoming air for cooling. A tubular housing accommodates the packed container. A fan blower within the top portion of the housing draws ambient air through the bottom of the container within the refrigerant-packed interior of the container against gravity to prolong the air cooling period. The encapsulated refrigerant is implemented as a plurality of compacted frozen glycol balls serving as primary source of cooling for the incoming air. A multitude of pockets filled with cold air form between the compacted frozen glycol balls during device operation. These cold air pockets serve as secondary source of cooling for the flowing air.

23 Claims, 6 Drawing Sheets

AIR COOLING DEVICE

CROSS-REFERENCE TO RELATED APPLICATION(S)

This document is a continuation application which is related to, and claims priority from, U.S. patent application Ser. No. 11/009,922, filed Dec. 10, 2004 now U.S. Pat. No. 7,127,910, which was published on Jun. 15, 2006, U.S. Patent Application Publication No. US 2006/0123832 A1, and which is incorporated herein in its entirety by reference.

BACKGROUND ART

Human beings normally function over a fairly narrow ambient temperature range. Adjustment of the amount and type of clothing may afford some relief from rising or falling ambient air temperature. However, as ambient air temperature steadily rises, conditioning the same by some form of heat extraction is a preferred solution to maintaining comfortable body temperature. Typically, such heat extraction is performed by air conditioners.

Air conditioners operate on the principle of heat absorption, whereby a refrigerant substance may gradually change phase from solid to liquid or from liquid to gas. Unfortunately, most of the known air conditioners are fairly bulky and costly to maintain. Various types of portable or semi-portable air cooling devices have been developed over the years. Most such air cooling devices are designed to cool an enclosed space, for example, rooms of a building, the interior of a motor vehicle, and the like. These air cooling devices must, therefore, be capable of efficiently cooling a relatively large volume of air. Unfortunately, known devices of this type require relatively costly and/or bulky power sources.

Some known air cooling devices utilize indirect conduction of heat between water and air with the cooling effect of air being relatively low. This increases the size and weight of the air cooling device and requires a bigger space for storage and/or installation. Other air cooling devices use a multi-tube type heat exchanger which requires a large quantity of cooling water to flow in a single pass or in a constantly circulating manner. Additionally, the maintenance of the heat exchanger is somewhat troublesome because of the necessity of cleaning the complicated cooling water tubes. Portable air conditioners or swamp cooler systems are designed for spot cooling, not for area cooling, and are, thus, relatively ineffective.

DISCLOSURE OF THE INVENTION

Some embodiments disclosed herein are generally directed to an air cooling device. In accordance with one aspect of the invention, the air cooling device comprises a thermally insulated container with partially open top and bottom. A primary source of cooling is provided within the thermally insulated container. The primary source of cooling comprises compacted frozen solid matter. The compacted frozen solid matter is configured to inhibit fluidity. A secondary source of cooling is also provided within the thermally insulated container. The secondary source of cooling comprises cold gaseous matter. The cold gaseous matter is accumulated during device operation within the compacted frozen solid matter.

The device includes a structure for pulling ambient air through the partially open bottom of the thermally insulated container over the primary and secondary sources of cooling against gravity to prolong the cooling period. The device also includes a structure for venting the cooled air through the partially open top of the thermally insulated container and away from the body of the thermally insulated container.

In accordance with another aspect of the invention, the air cooling device comprises a thermally insulated container with partially open top and bottom. A primary source of cooling is provided within the thermally insulated container. This primary source of cooling comprises compacted frozen glycol balls. The compacted frozen glycol balls are configured to inhibit fluidity. A secondary source of cooling is provided within the thermally insulated container. The secondary source of cooling comprises cold gaseous matter. The cold gaseous matter is accumulated during device operation in a multitude of pockets formed between the compacted frozen glycol balls.

A fan blower is operatively coupled over the partially open top of the thermally insulated container and configured to draw ambient air through the partially open bottom of the thermally insulated container over the primary and secondary sources of cooling against gravity to prolong the cooling period. The fan blower is adapted to vent the cooled air away from the body of the thermally insulated container.

In accordance with yet another aspect of the invention, the air cooling device comprises a housing with an air outlet portion at the top and a mesh-like air intake portion at the bottom. A thermally insulated container with partially open top and bottom is included. The thermally insulated container is adapted for insertion into the housing. A primary source of cooling is provided within the thermally insulated container. This primary source of cooling comprises compacted frozen glycol balls. The compacted frozen glycol balls are configured to inhibit fluidity. A secondary source of cooling is provided within the thermally insulated container. The secondary source of cooling comprises cold gaseous matter. The cold gaseous matter is accumulated during device operation in a multitude of pockets formed between the compacted frozen glycol balls.

A fan blower is operatively coupled between the air outlet portion of the housing and the partially open top of the inserted thermally insulated container. The fan blower is configured to draw ambient air through the partially open bottom of the thermally insulated container over the primary and secondary sources of cooling against gravity to prolong the cooling period. The fan blower is adapted to vent the cooled air to the environment via the air outlet portion of the housing.

In accordance with still another aspect of the invention, the air cooling device comprises a housing with an air outlet portion at the top and a mesh-like air intake portion at the bottom. A thermally insulated container with partially open top and bottom is included. The thermally insulated container is adapted for insertion into the housing. A primary source of cooling is provided within the thermally insulated container. This primary source of cooling comprises compacted frozen glycol balls. The compacted frozen glycol balls are configured to inhibit fluidity. A secondary source of cooling is provided within the thermally insulated container. The secondary source of cooling comprises cold gaseous matter. The cold gaseous matter is accumulated during device operation in a multitude of pockets formed between the compacted frozen glycol balls.

A fan blower is operatively coupled between the air outlet portion of the housing and the partially open top of the inserted thermally insulated container. At least one filter is operatively coupled between the partially open top of the inserted thermally insulated container and the fan blower.

The fan blower is configured to suction ambient air through the partially open bottom of the thermally insulated container for cooling. The suctioned air flows over the compacted frozen glycol balls via the multitude of pockets against gravity to prolong the cooling period. The fan blower is further configured to vent the cooled filtered air to the environment through the air outlet portion of the housing.

In accordance with a different aspect of the invention, the air cooling device comprises a housing with an air outlet portion at the top and a mesh-like air intake portion at the bottom. A thermally insulated container with partially open top and bottom is included. The thermally insulated container is adapted for insertion into the housing. A primary source of cooling is provided within the thermally insulated container. This primary source of cooling comprises compacted frozen balls configured to inhibit fluidity. Each of the frozen balls is filled with a cooling agent capable of freezing and sustaining its frozen state for periods longer than water once exposed to the atmosphere.

A secondary source of cooling is also provided within the thermally insulated container. This secondary source of cooling comprises cold gaseous matter. The cold gaseous matter is accumulated during device operation in a multitude of pockets formed between the compacted frozen balls.

A fan blower is operatively coupled between the air outlet portion of the housing and the partially open top of the inserted thermally insulated container. At least one filter is operatively coupled between the partially open top of the inserted thermally insulated container and the fan blower. The fan blower is configured to suction ambient air through the partially open bottom of the thermally insulated container for cooling. The suctioned air flows over the compacted frozen balls via the multitude of pockets against gravity to prolong the cooling period. The fan blower is further configured to vent the cooled filtered air to the environment through the air outlet portion of the housing. Other features of the present invention are disclosed, or are apparent, in the section entitled "Mode(s) for Carrying-Out the Invention," disclosed, infra.

BRIEF DESCRIPTION OF THE DRAWINGS

For a better understanding of the present invention, reference is made to the below-referenced accompanying Drawing(s). Reference numbers refer to the same or equivalent parts of the present invention throughout the several figures of the Drawing(s).

MODE(S) FOR CARRYING-OUT THE INVENTION

The detailed description of the mode(s) for carrying-out the invention, set forth below in connection with the appended drawings, is intended as a description of exemplary embodiments and is not intended to represent the only forms in which the exemplary embodiments may be constructed and/or utilized. The description sets forth the functions and the sequence of steps for constructing and operating the exemplary embodiments in connection with the illustrated embodiments. However, understood is that the same or equivalent functions and sequences may be accomplished by different embodiments that are also intended to be encompassed within the spirit and scope of the invention.

Some embodiments of the present invention will be described in detail with reference to the related drawings of FIGS. 1-8. Additional embodiments, features and/or advantages of the invention will become apparent from the ensuing description or may be learned by practicing the invention and are encompassed by the present invention. In the figures, the drawings are not to scale with like numerals referring to like features throughout both the drawings and the description.

Figure 1:
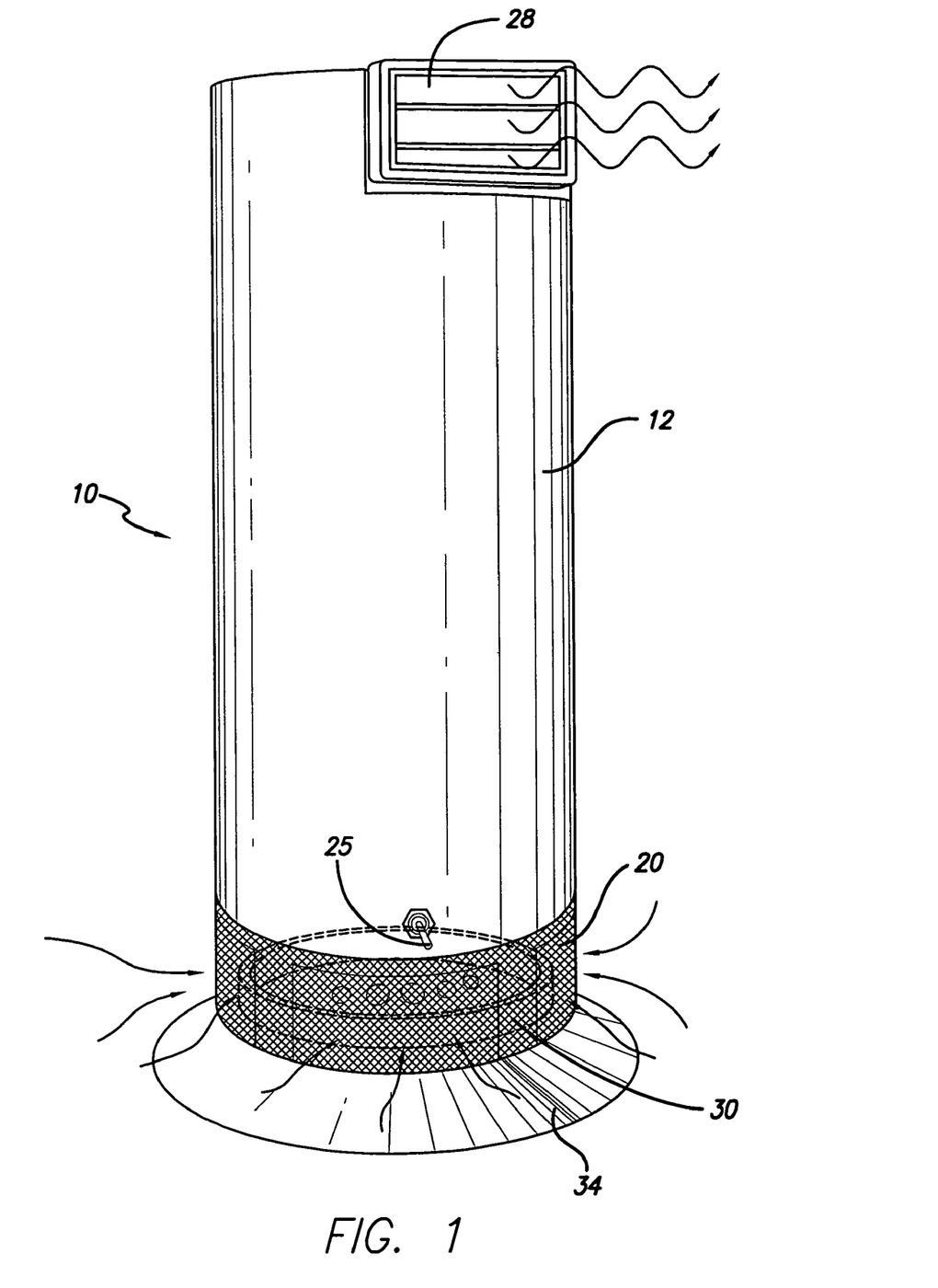
FIG. 1 is a front perspective view of an air cooling device, in accordance with one embodiment of the present invention.
Figure 2:
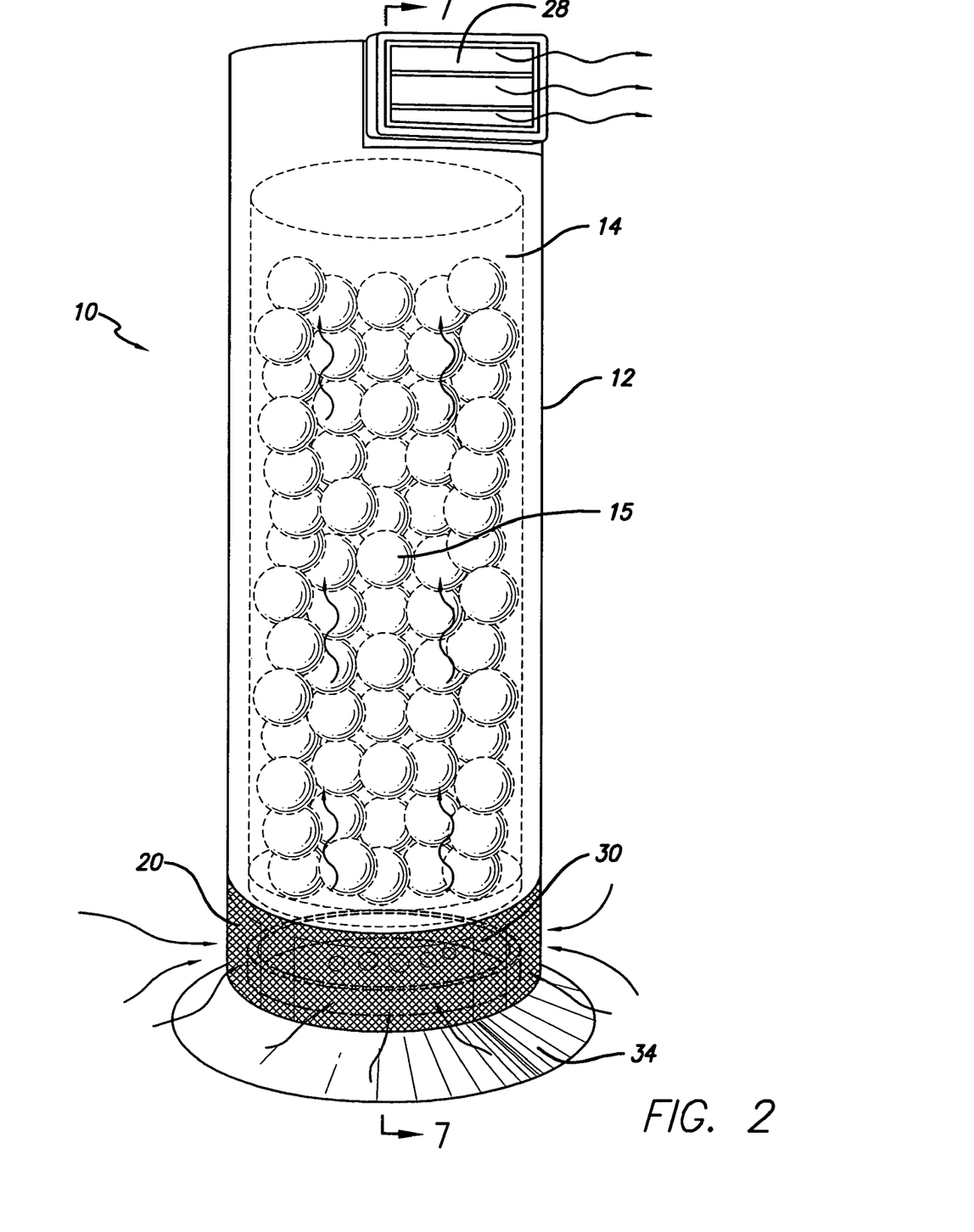
FIG. 2 is a schematic view showing exemplary air flow in the air cooling device of FIG. 1.
Figures 3, 4:
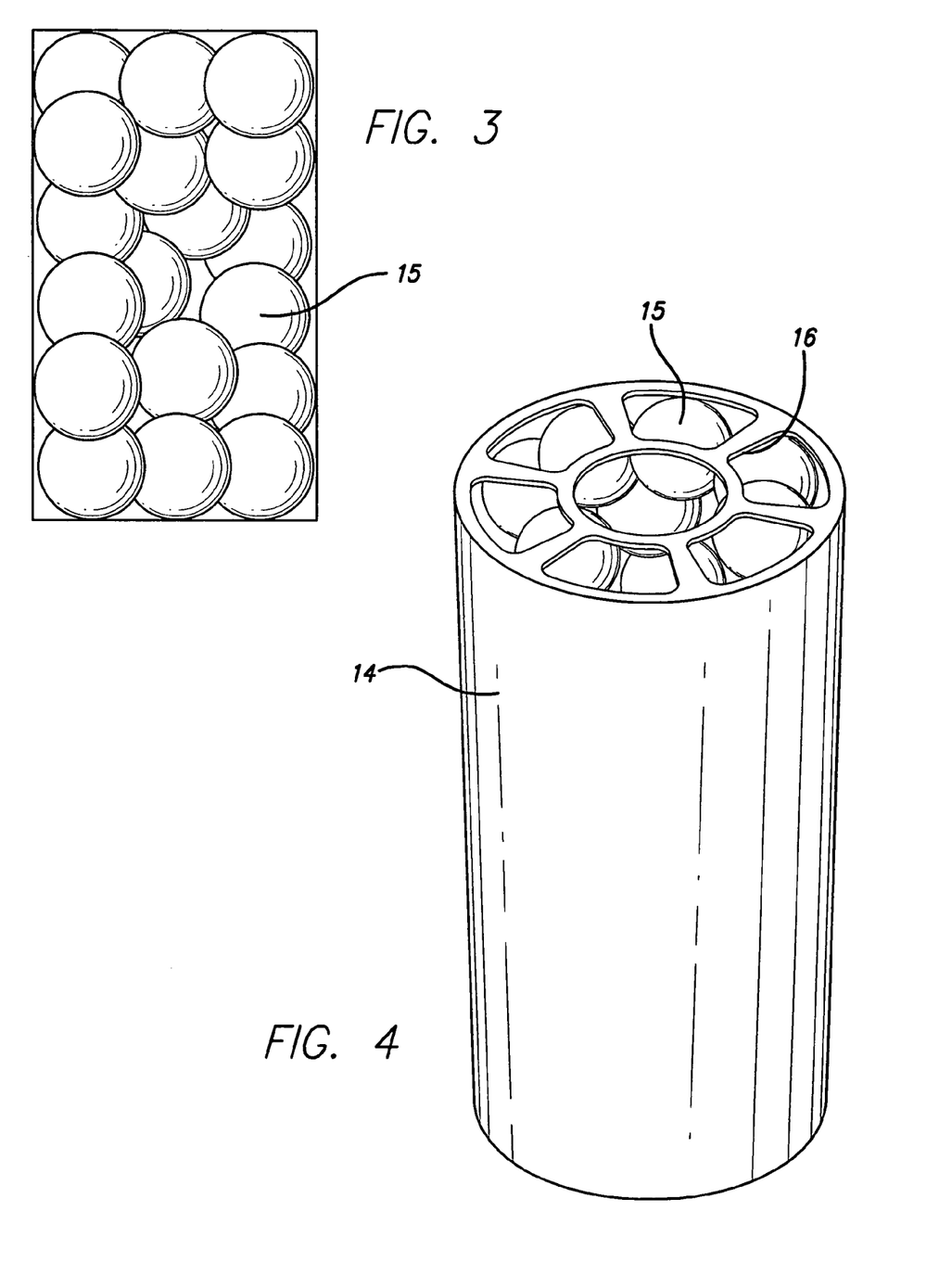
FIG. 3 is a partial perspective view of the exemplary embodiment of FIG. 2.
FIG. 4 is a perspective view of components being used in the air cooling device of FIG. 1.

FIG. 1 is a front perspective view of an air cooling device 10, in accordance with one embodiment of the present invention. Air cooling device 10 comprises a generally tubular housing 12 (FIG. 1) adapted to accommodate a thermally insulated container 14 containing encapsulated refrigerant 15, as generally shown in FIG. 2. Encapsulated refrigerant 15 is configured as a plurality of compacted frozen balls/bubbles (FIG. 3). Each ball/bubble is filled with a cooling agent that is capable of freezing and sustaining its frozen state for periods longer than water once exposed to the atmosphere. Cooling agents of this type may include ethylene glycol and its polymers, propylene glycol and its polymers, glycerol and its polymers, and/or the like.

The cooling agent may be injected in the balls/bubbles before freezing. Alternatively, the cooling agent may be automatically encapsulated at a manufacturing facility. For example, glycol balls may be trapped between two relatively thin, flexible sheets of plastic. The plastic sheets may be heat-sealed together to securely and compactly trap the glycol balls between the sheets. The trapped glycol balls may be mass-produced in encapsulated sheet form and cut to size, as needed. A household or commercial freezer may be used to freeze the encapsulated glycol balls. One or more frozen glycol sheets may be inserted in thermally insulated container 14, as needed. Unused glycol sheets are easily stored away for later use.

Container 14 may be made from plastic, foam or other suitable thermally insulating material. Container 14 has a partially open top 16 (FIG. 4) and a partially open bottom 18 (FIG. 6) adapted to allow air to flow there through. Partially open top 16 and/or partially open bottom 18 may be removed to allow the insertion of encapsulated refrigerant 15. With encapsulated refrigerant 15 packed inside (FIG. 2), container 14 is introduced into the hollow interior of housing 12, as generally depicted by directional arrow 17 in FIG. 5.

Figures 5, 6:
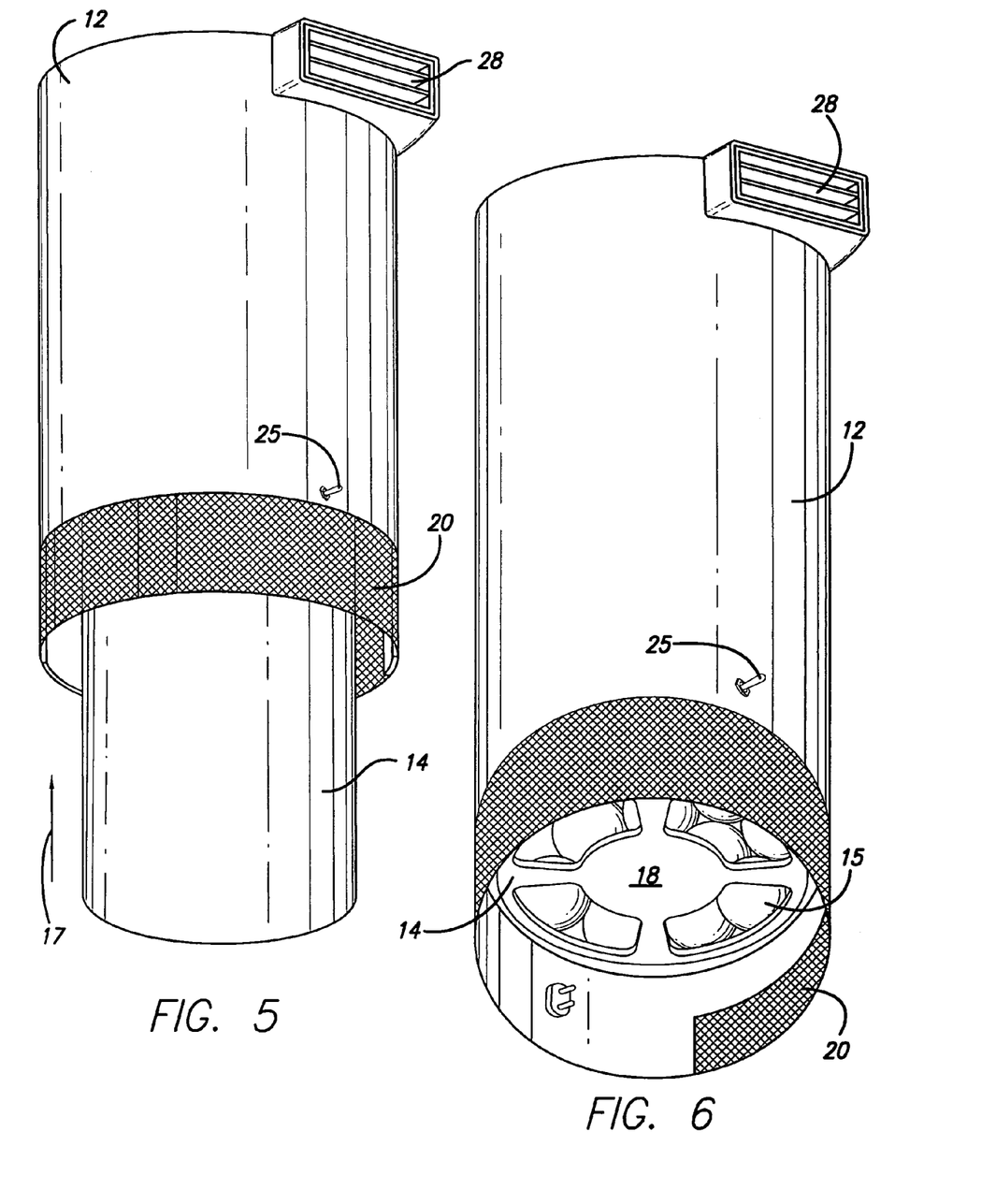
FIG. 5 is a perspective view of components of the air cooling device of FIG. 1 being in a partially assembled state.
FIG. 6 is a perspective view of the components of FIG. 5 being in fully assembled state.
Figure 7:
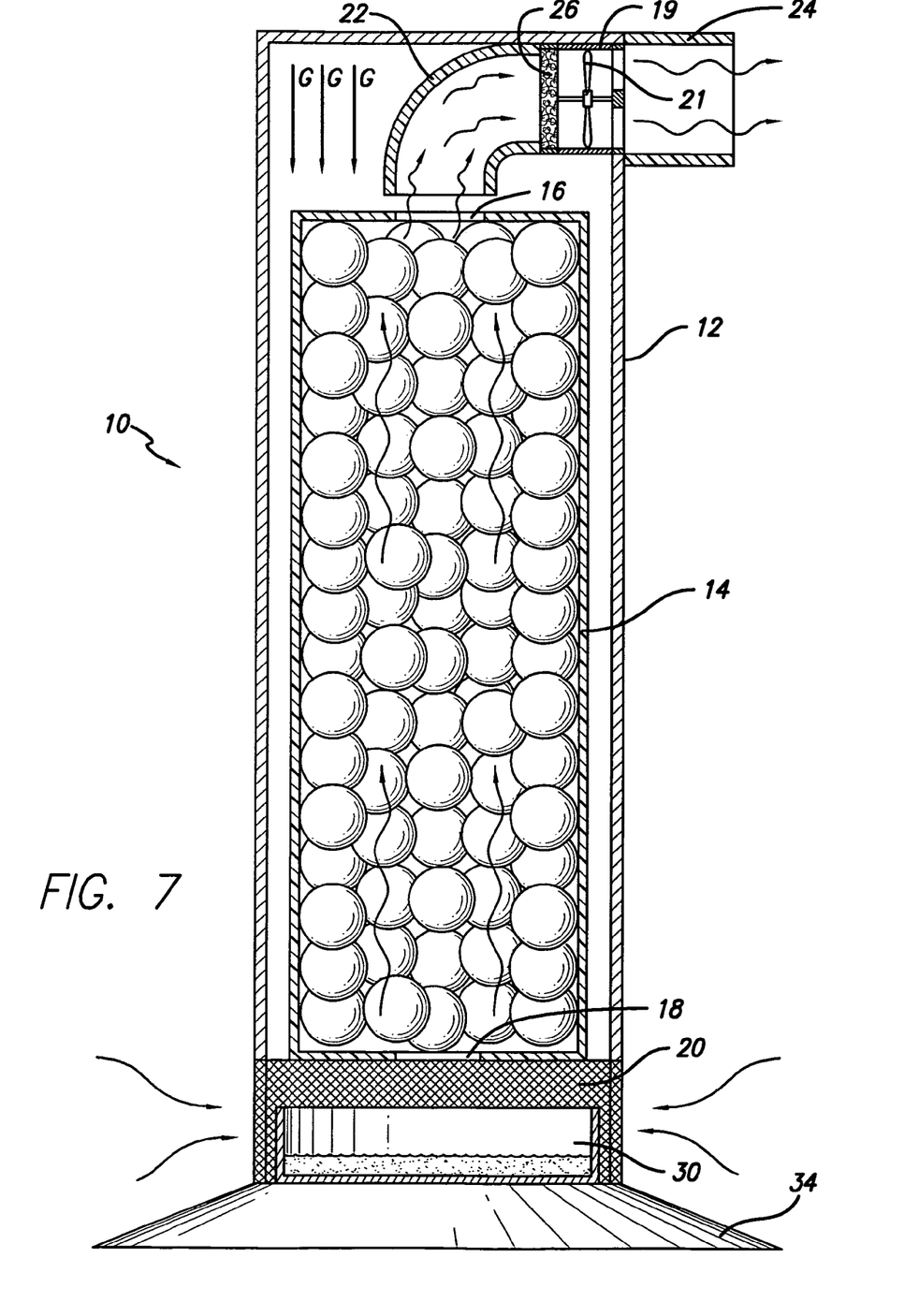
FIG. 7 is a cross-sectional operational view along section line 7-7 of FIG. 2.

Housing 12 is equipped at one end with a blower 19 and at an opposite end with a mesh-like air intake portion 20, as generally illustrated in FIGS. 1-2 and 5-8. Ambient air is pulled inside refrigerant-packed container 14 for cooling by blower 19 (FIG. 7) via air intake portion 20 and partially open bottom 18. Blower 19 has fan blade(s) 21 being driven by an integral motor (not shown), an air inlet section 22 and an air outlet section 24 (FIG. 7). Air inlet section 22 is in communication with cold air coming from the interior of container 14 through partially open top 16. Air inlet section 22 may be equipped with an air filter 26 (FIG. 7). The blower motor is turned-on by a switch 25 operatively mounted on the exterior of housing 12 (FIGS. 1, 5-6). Once turned-on, blower 19 evacuates cold air from the interior of container 14 via air inlet section 22, and blows the same out of the unit via air outlet section 24 and vent 28, as generally shown in FIGS. 1-2.

With blower 19 being mounted at the top, rather than at the bottom of housing 12, the incoming air is forced to flow inside refrigerant-packed container 14 against gravity G (FIG. 7), i.e., the air flow rate is purposely slowed down to allow for a longer air cooling period. A faster flow rate would contribute to a more rapid deterioration of encapsulated refrigerant 15. A relatively slower flow rate would prolong the "cold life" of each frozen glycol ball/bubble. Air is gradually cooled by flowing over the frozen glycol bubbles which collectively serve as a primary cooling source. Cold air is accumulated in air pockets formed between the compacted frozen glycol bubbles. This accumulated cold air serves as a secondary cooling source.

Contemplated by the present invention is that, if an accumulation of frozen glycol bubbles does not exist, i.e., if container 14 is packed with a single contiguous refrigerant mass, cold air would only be produced from flowing around the exterior surface of the refrigerant mass. No secondary source of cooling the air would exist. Moreover, if ambient air is blown against (as opposed to being sucked-in) such refrigerant mass, the ambient air would rapidly cause deterioration of the refrigerant surface. In such case, the overall cooling efficiency of the device may be degraded.

The provision of multiple refrigerant surfaces and air pockets therebetween, as contemplated by compactly packing encapsulated refrigerant 15 into thermally insulated container 14, ensures significantly improved cooling efficiency for air cooling device 10 when compared to related art cooling devices. The cooled air flows through the entire refrigerant-packed container 14. The size of each frozen glycol ball, as well as the compactness of the balls may be varied, as needed. Clearly, if the ball size is too small, insufficient cooling surface area would exist. On the other hand, if the ball size is too big, the air pockets would grow in size which would have a detrimental effect on the cooling of incoming air, i.e., the air flow rate would increase. In one example, the cross section of a frozen glycol ball is about 3.5 inches. Other suitable ball sizes may be utilized, as needed.

Figure 8:
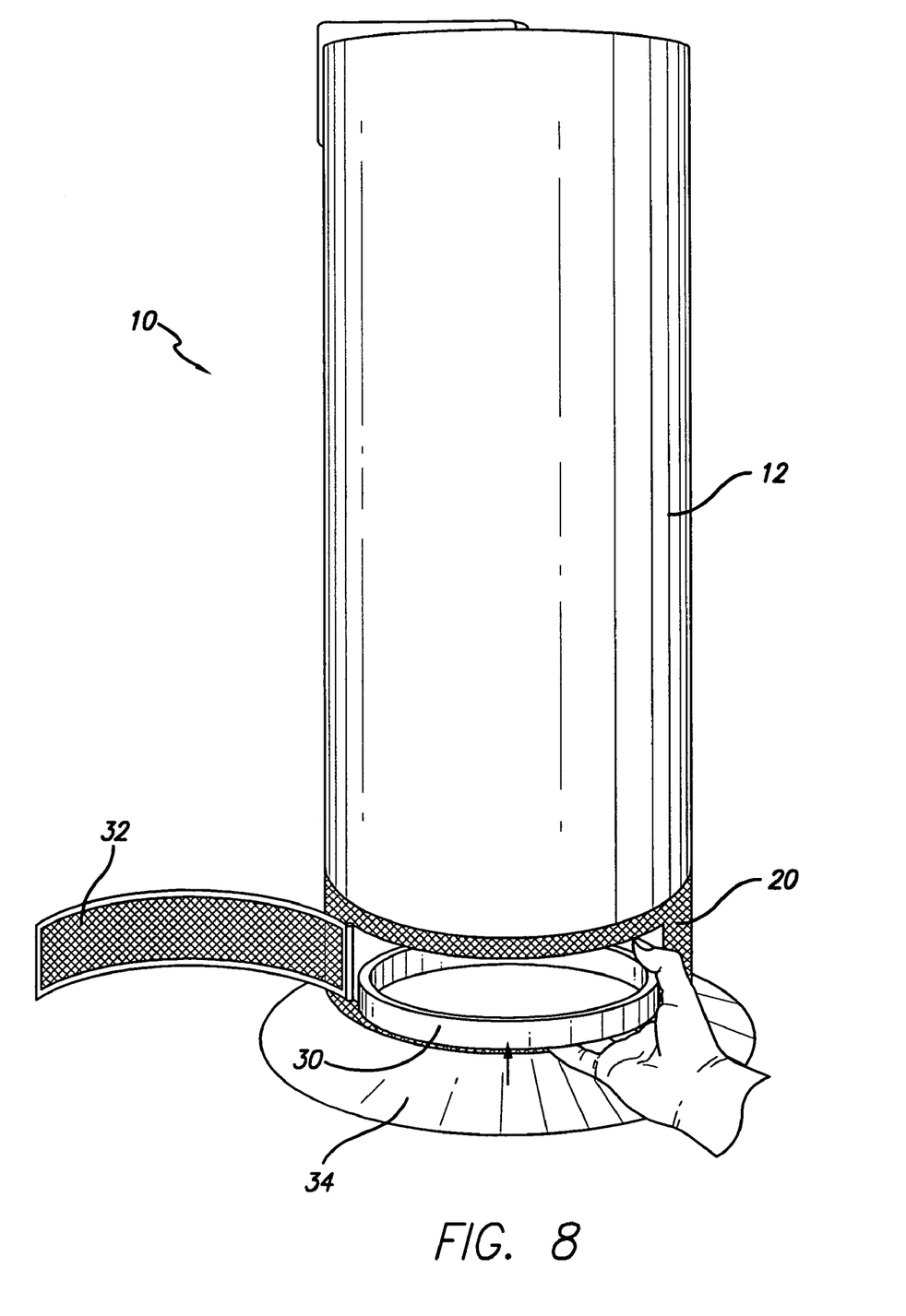
FIG. 8 is a rear perspective view of the air cooling device of FIG. 1.

Exposing warm ambient air to a cold environment leads to condensation. A condensation pan 30 (FIG. 8) is provided inside housing 12 under partially open bottom 18 of refrigerant packed container 14. Condensation pan 30 is adapted to capture water droplets formed during the air cooling process. Since blower 19 is mounted at the top of housing 12, there is no risk of water droplets falling on any electric/electronic part exists. Also, with the evacuation effect produced from above by air inlet section 22 of blower 19, dispersion of formed water droplets within container 14 would be significantly inhibited. Condensation pan 30 is introduced into or removed from housing 12 via maintenance door 32, as generally depicted in FIG. 8. Maintenance door 32 may be formed as an integral part of mesh-like air intake portion 20. Maintenance door 32 may be adapted to pivot toward and away from the interior of housing 12. Housing 12 may be mounted at its air intake end to a base 34 (FIG. 8).

The air cooling device of the present invention may be configured as a table top unit, a floor standing unit, or a hand-held unit. Other configurations may be possible, provided such other configurations reside within the intended scope of the present invention. For example, housing 12 may be adapted to accommodate a plurality of thermally insulated containers, each packed with encapsulated refrigerant. The thermally insulated containers may be operatively coupled in series and/or in parallel. Moreover, each of the glycol-filled balls may be made with a relatively rough (textured) surface to inhibit fluidity, i.e., to further slow down the cooling period for the incoming air.

The air cooling device of the present invention is easy to maintain and/or store away, if not needed. Other materials may be used to construct the air cooling device of the present invention, provided such other materials do not deviate from the intended scope and spirit of the present invention. The air cooling device of the present invention has a relatively small footprint, while offering users an attractive and efficient portable cooling solution.

A person skilled in the art would appreciate that exemplary embodiments described hereinabove are merely illustrative of the general principles of the present invention. Other modifications or variations may be employed that are within the scope of the invention. Thus, by way of example, but not of limitation, alternative configurations may be utilized in accordance with the teachings herein. Accordingly, the drawings and description are illustrative and not meant to be a limitation thereof.

Moreover, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Thus, intended is that the invention covers all embodiments and variations thereof as long as such embodiments and variations come within the scope of the appended claims and their equivalents.

What is claimed is:

1. An air cooling device, comprising:
    a thermally insulated container with partially open top and bottom;
    a primary source of cooling provided within said thermally insulated container and comprising compacted frozen solid matter, said compacted frozen solid matter being configured to inhibit fluidity and comprising at least one encapsulated refrigerant;
    a secondary source of cooling provided within said thermally insulated container and comprising cold gaseous matter, said cold gaseous matter being accumulated during device operation within said compacted frozen solid matter;
    means for pulling ambient air through said partially open bottom of said thermally insulated container over said primary and secondary sources of cooling against gravity to prolong the cooling period; and
    means for venting the cooled air through said partially open top of said thermally insulated container and away from the body of said thermally insulated container,
    wherein said compacted frozen matter is trapped between flexible sheets of plastic.

2. An air cooling device, comprising:
    a thermally insulated container with partially open top and bottom;
    a primary source of cooling provided within said thermally insulated container and comprising compacted frozen solid matter, said compacted frozen solid matter being configured to inhibit fluidity and comprising at least one encapsulated refrigerant, the at least one encapsulated refrigerant comprising a plurality of compacted balls containing frozen glycol;

a secondary source of cooling provided within said thermally insulated container and comprising cold gaseous matter, said cold gaseous matter being accumulated during device operation in a multitude of pockets formed between said plurality of compacted balls; and a fan blower operatively coupled over said partially open top of said thermally insulated container and configured to draw ambient air through said partially open bottom of said thermally insulated container over said primary and secondary sources of cooling against gravity to prolong the cooling period, said fan blower being adapted to vent the cooled air away from the body of said thermally insulated container, wherein said compacted frozen matter is trapped between flexible sheets of plastic.

3. An air cooling device, comprising:

a housing with an air outlet portion at the top and a mesh-like air intake portion at the bottom;

a thermally insulated container with partially open top and bottom, said thermally insulated container adapted for insertion into said housing;

a primary source of cooling provided within said thermally insulated container and comprising compacted frozen solid matter, said compacted frozen solid matter being configured to inhibit fluidity and comprising at least one encapsulated refrigerant, the at least one encapsulated refrigerant comprising a plurality of compacted balls containing frozen glycol;

a secondary source of cooling provided within said thermally insulated container and comprised of cold gaseous matter, said cold gaseous matter being accumulated during device operation in a multitude of pockets formed between said plurality of compacted balls; and a fan blower operatively coupled between said air outlet portion of said housing and said partially open top of said inserted thermally insulated container, said fan blower configured to draw ambient air through said partially open bottom of said thermally insulated container over said primary and secondary sources of cooling against gravity to prolong the cooling period, said fan blower being adapted to vent the cooled air to the environment via said air outlet portion of said housing, wherein said compacted frozen matter is trapped between flexible sheets of plastic.

4. An air cooling device, comprising:

a housing with an air outlet portion at the top and a mesh-like air intake portion at the bottom;

a thermally insulated container with partially open top and bottom, said thermally insulated container adapted for insertion into said housing;

a primary source of cooling provided within said thermally insulated container and comprising compacted frozen solid matter, said compacted frozen solid matter being configured to inhibit fluidity and comprising at least one encapsulated refrigerant, the at least one encapsulated refrigerant comprising a plurality of compacted balls containing frozen glycol;

a secondary source of cooling provided within said thermally insulated container and comprising cold gaseous matter, said cold gaseous matter being accumulated during device operation in a multitude of pockets formed between said plurality of compacted balls;

a fan blower operatively coupled between said air outlet portion of said housing and said partially open top of said inserted thermally insulated container; and at least one filter operatively coupled between said partially open top of said inserted thermally insulated container and said fan blower, said fan blower being configured to suction ambient air through said partially open bottom of said thermally insulated container for cooling, said suctioned air flowing over said compacted balls via said multitude of pockets against gravity to prolong the cooling period, said fan blower further being configured to vent the cooled filtered air to the environment through said air outlet portion of said housing, wherein said compacted frozen matter is trapped between flexible sheets of plastic.

5. An air cooling device, comprising:

a housing with an air outlet portion at the top and a mesh-like air intake portion at the bottom;

a thermally insulated container with partially open top and bottom, said thermally insulated container adapted for insertion into said housing;

a primary source of cooling provided within said thermally insulated container and comprising compacted frozen solid matter being configured to inhibit fluidity and comprising at least one encapsulated refrigerant, the at least one encapsulated refrigerant comprising a plurality of compacted balls containing a cooling agent, the cooling agent being capable of freezing and sustaining its frozen state for periods longer than water once exposed to the atmosphere;

a secondary source of cooling provided within said thermally insulated container and comprising cold gaseous matter, said cold gaseous matter being accumulated during device operation in a multitude of pockets formed between said plurality of compacted balls;

a fan blower operatively coupled between said air outlet portion of said housing and said partially open top of said inserted thermally insulated container; and at least one filter being operatively coupled between said partially open top of said inserted thermally insulated container and said fan blower, said fan blower being configured to suction ambient air through said partially open bottom of said thermally insulated container for cooling, said suctioned air flowing over said plurality of compacted balls via said multitude of pockets against gravity to prolong the cooling period, said fan blower further being configured to vent the cooled filtered air to the environment through said air outlet portion of said housing, wherein said compacted frozen matter is trapped between flexible sheets of plastic.

6. The air cooling device of claim 5, wherein said cooling agent is ethylene glycol.

7. The air cooling device of claim 5, wherein said cooling agent is an ethylene glycol polymer.

8. The air cooling device of claim 5, wherein said cooling agent is propylene glycol.

9. The air cooling device of claim 5, wherein said cooling agent is a propylene glycol polymer.

10. The air cooling device of claim 5, wherein said cooling agent is glycerol.

11. The air cooling device of claim 5, wherein said cooling agent is a glycerol polymer.

12. The air cooling device of claim 5, wherein said cooling agent is injected in each of said balls.

13. The air cooling device of claim 4, wherein the flexible plastic sheets are heat-sealed to securely and compactly trap said glycol balls between the sheets.

14. The air cooling device of claim 4, wherein said thermally insulated container is made from plastic material.

15. The air cooling device of claim 4, wherein said thermally insulated container is made from foam.

16. The air cooling device of claim 5, wherein at least one of said frozen balls is provided with a textured surface to inhibit fluidity.

17. The air cooling device of claim 4, wherein at least one of said frozen glycol balls is provided with a textured surface to inhibit fluidity.

18. The air cooling device of claim 3, wherein at least one of said frozen glycol balls is provided with a textured surface to inhibit fluidity.

19. The air cooling device of claim 2, wherein at least one of said frozen glycol balls is provided with a textured surface to inhibit fluidity.

20. The air cooling device of claim 5, further comprising a maintenance door formed as an integral part of said mesh-like air intake portion.

21. The air cooling device of claim 20, wherein incoming ambient air passes through said integral maintenance door.

22. The air cooling device of claim 4, further comprising a maintenance door formed as an integral part of said mesh-like air intake portion.

23. The air cooling device of claim 22, wherein incoming ambient air passes through said integral maintenance door.

\* \* \* \* \*